June 3, 1930.                L. MAMBOURG                 1,761,220
                    DRAW POT FOR SHEET GLASS APPARATUS
                           Filed Dec. 9, 1926
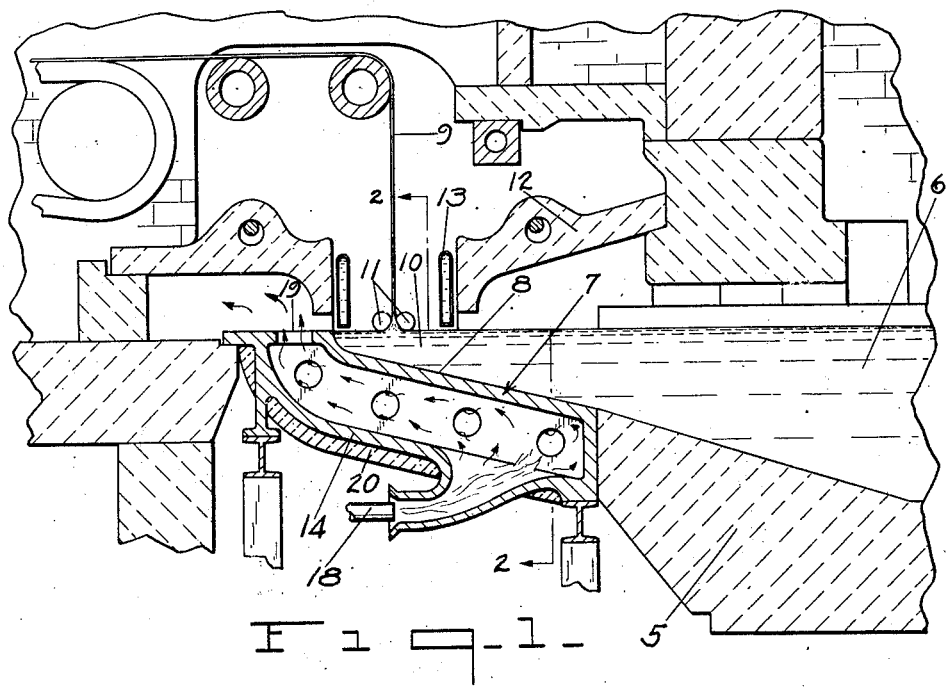
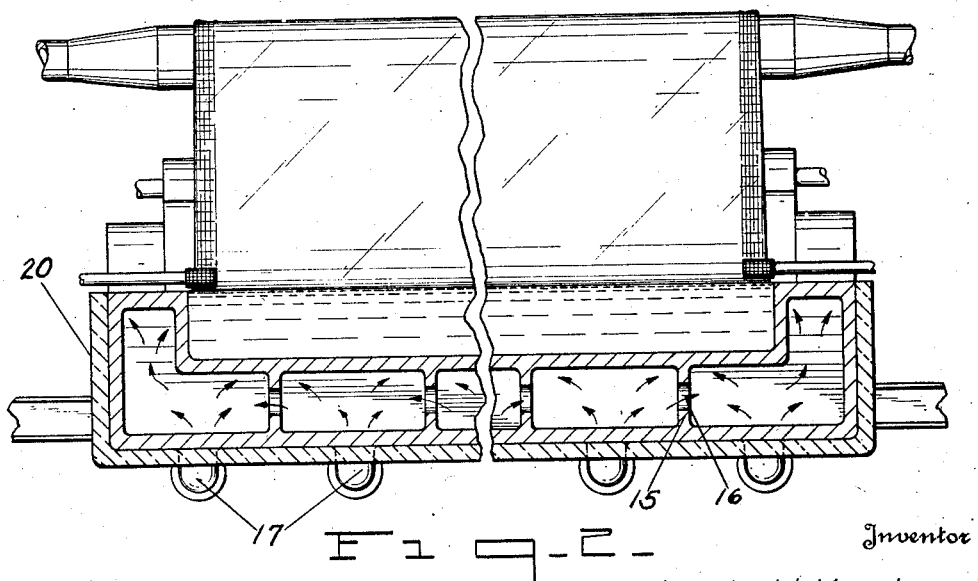
Inventor
Leopold Mambourg
By Frank Fraser,
Attorney Patented June 3, 1930

1,761,220

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

DRAW POT FOR SHEET-GLASS APPARATUS

Application filed December 9, 1926. Serial No. 153,509.

The present invention relates to sheet glass apparatus, and particularly to a draw pot therefor.

An important object of the present invention is to provide, in sheet glass apparatus, an improved form of draw pot, the draw pot being formed preferably from metal.

Another object of the invention is to provide, in sheet glass apparatus, a metallic draw pot being formed preferably from a non-corrosive material, the said draw pot being formed from spaced walls to provide a heating compartment so that the temperature of the glass therein can be properly and accurately controlled.

A further object of the invention is to provide a draw pot formed from a non-corrosive metal, the said draw pot having passageways through which heated air may be circulated, the outer wall of the pot being preferably insulated.

Other objects and advantages of the invention will become more apparent during the course of the following description.

In the drawings wherein like numerals are employed to designate like parts throughout the same, Fig. 1 is a vertical longitudinal section through a form of sheet glass apparatus illustrating my invention in use, and Fig. 2 is a section taken on line 2—2 in Fig. 1, and looking in the direction of the arrows.

The present invention is particularly adapted for use in the type of machines set forth in the Colburn Patent No. 1,248,809, granted December 4, 1917, although it is to be clearly understood that the invention is not in any way restricted to use in connection with such machine. In the Colburn machine disclosed in this patent, a sheet of glass is continuously drawn from a mass of molten glass contained in a draw pot. In the past, the draw pot has been formed from a refractory clay. The use of refractory clay necessitates a comparatively thick wall pot, and as the refractory clay is a comparatively poor conductor, it is a difficult matter to properly condition the glass. It is customary to heat the bottom of the pot, but as has been pointed out, due to the poor conductivity of the refractory clays used, it is practically impossible to maintain the glass contained therein at exactly the desired temperature. Improper heating, which usually means inadequate heating of the glass, encourages an accumulation of stagnant glass, which in time becomes devitrified, forming what is known in the art as dog metal. When the dog metal starts to form, it is necessary to stop production of a commercial sheet and remove the same.

The present invention has been designed to overcome the difficulties now encountered with the type of draw pot used.

In the drawings, the numeral 5 designates a tank furnace containing a mass of molten glass 6. My improved draw pot is designated in its entirety by the numeral 7. The draw pot 7 is preferably formed from a non-corrosive metal such as nichrome, Monel, stellite, chromium plated metals, etc. The shape of the pot varies from that ordinarily used in that the inner wall 8 is placed on an incline so that the closed end of the pot will be relatively very shallow. A sheet of glass 9 may be constantly drawn from the surface of the glass 10 in said draw pot. Suitable edge engaging means 11 may be provided to prevent narrowing of the sheet at its base, while lip tiles 12 and lip tile coolers 13 may be provided to shield the sheet as is well understood in the art. In carrying out the present invention, the base of the sheet 9 is preferably arranged relatively close to the closed end of said pot so that the tendency toward an accumulation of stagnant glass will be practically eliminated. The pot 7 comprises the spaced walls 8 and 14, forming, by means of the ribs 15 shown in Fig. 2, a plurality of passageways through which heated air may be circulated. The ribs or partition walls 15 are provided with openings 16 to permit the passage of heated air from one compartment to another. It will be noted in Fig. 2 that the passageways also extend around the sides of the pot so that the glass will be heated along its sides as well as along its bottom. Suitable extensions 17 may be provided, the said extensions communicating with the passageways formed between the walls 8 and 14 of the pot. Gas burners 18 may be used to heat the interior of the pot, while the products of combustion may escape through the exit 19 shown in Fig. 1. By providing a plurality of the means 17 it will be seen that the temperature of the glass can be controlled transversely of its flow so that in the event the glass develops a cold streak or a hot streak, the intensity of the heat along the bottom of the pot can be changed to correct this condition. As is well known, metal is an excellent conductor so that the glass can be readily heated. The outer wall 14 of the pot is covered with a suitable insulation 20 to prevent undue radiation of heat in this direction.

It will thus be seen that my new form of pot offers a construction wherein a sheet of high quality can be continuously drawn from a mass of molten glass therein. The shape of the pot is such that the glass entering the same will be continuously used. Also, the pot is of such a nature that the glass contained therein can be heated efficiently, thus reducing to a minimum the accumulation of stagnant glass and the consequent formation of dog metal. Obviously, electrical heating means can be substituted for the fuel, if desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a draw pot formed from a non-corrosive metal and having compartments therein, and means for heating said compartments.

2. In sheet glass apparatus, a draw pot formed from a non-corrosive metal, said pot comprising spaced walls, and means for passing heated air between said walls.

3. In sheet glass apparatus, a draw pot comprising an inner and an outer wall, said walls being formed from non-corrosive metal and arranged in spaced relation, means for heating the pot, and means for insulating the outer wall.

4. In sheet glass apparatus, a draw pot comprising an inner and an outer wall, said walls being formed from non-corrosive metal and arranged in spaced relation, means for heating the pot between its walls, and means for insulating the outer wall.

5. A draw pot for use in the Colburn process for drawing sheet glass, said pot comprising an inner and an outer wall, the inner wall being formed from a non-corrosive metal, and means for heating the pot between its walls.

6. In sheet glass apparatus, a draw pot adapted to contain a pool of molten glass, comprising an inner and an outer wall, the inner wall being formed from a non-corrosive metal, means for drawing a sheet upwardly from said pool, and means for heating the pot between its walls.

7. In sheet glass apparatus, a draw pot comprising an inner and an outer wall, said walls being formed from a non-corrosive metal and arranged in spaced relation, and means for heating the pot between its walls.

8. In sheet glass apparatus, a draw pot comprising inner and outer spaced walls, the inner wall of said pot being inclined and formed from a non-corrosive metal, and means for heating the pot between its walls.

9. In sheet glass apparatus, a draw pot formed from a non-corrosive metal and including spaced inner and outer bottom and side walls, and means for heating the pot between its walls.

10. In sheet glass apparatus, a draw pot formed from a non-corrosive metal and including inner and outer spaced walls, means between said walls dividing the interior of the pot into a plurality of longitudinally extending compartments, and means for heating said compartments.

11. In sheet glass apparatus, a draw-pot adapted to contain a mass of molten glass comprising an inner and outer wall arranged in spaced relation and connected at their upper ends, the inner wall of the pot being inclined, and means for heating the pot between its walls.

12. In sheet glass apparatus, a draw-pot adapted to contain a pool of molten glass comprising an inner and outer wall arranged in nested relationship and spaced to each other, said walls being formed to create a closed end and side walls for said pot, the bottom of the inner wall being inclined upwardly toward the end wall thereof, and means for heating the pot between the inner and outer walls.

13. In sheet glass apparatus, a draw-pot adapted to contain a pool of molten glass comprising an inner and outer wall arranged in nested relationship and spaced to each other, said walls being formed to create a closed end and side walls for said pot, the bottom of the inner wall being inclined upwardly toward the end wall thereof, and means for heating the pot between the inner and outer walls, the space between said inner and outer walls being provided with partitions to separate the space into a plurality of compartments through which heated air may circulate and to also effect a bracing of the inner wall.

Signed at Lancaster, in the county of Fairfield and State of Ohio, this 4th day of December 1926.

LEOPOLD MAMBOURG.